May 18, 1965     A. J. TELLER     3,183,649
STEPWISE ROTARY ADSORBER INCLUDING INFLATABLE SEAL
Filed Aug. 29, 1961     2 Sheets-Sheet 1

INVENTOR.
AARON J. TELLER
BY
Walter J. Monacelli
HIS ATTORNEY

May 18, 1965  A. J. TELLER  3,183,649
STEPWISE ROTARY ADSORBER INCLUDING INFLATABLE SEAL
Filed Aug. 29, 1961  2 Sheets-Sheet 2

INVENTOR.
AARON J. TELLER
BY
Walter J. Monacelli
HIS ATTORNEY

US Patent Office
3,183,649
Patented May 18, 1965

3,183,649
STEPWISE ROTARY ADSORBER INCLUDING
INFLATABLE SEAL
Aaron J. Teller, Shaker Heights, Ohio, assignor to Mass
Transfer, Inc., Cleveland Heights, Ohio, a corporation
of Ohio
Filed Aug. 29, 1961, Ser. No. 134,765
11 Claims. (Cl. 55—179)

This invention relates to apparatus for recovery or removal of vapors or gases from an atmosphere in which they are contained. More specifically it relates to vapor or gas adsorption or absorption equipment in which the adsorption or absorption efficiency of the apparatus can be easily and efficiently regenerated. As used hereinafter, the term "vapor" is intended to include non-condensible or difficultly condensible gases.

In many commercial atmospheres containing solvent vapors or noxious gases which either have a value in their recovery or need to be removed to prevent air pollution, the means for recovery or removal is generally so inefficient or so expensive as to make such recovery or removal impractical.

In a typical dry cleaning operation, for example, liquid dry cleaning solvent generally is removed from the garments being cleaned by draining and then by a centrifugal operation which throws the liquid solvent from the garment by centrifugal force. Then, the garments are more completely dried by passing hot air through a chamber in which the garments are tossed or otherwise suspended. The atmosphere emanating from such a drying chamber is superladen with vapors of the dry cleaning solvent which can be directly adsorbed on an adsorbing material, such as activated carbon, either directly or after a portion of the solvent has been condensed therefrom by cooling. Generally, this adsorption has been effected in the prior art by passing such an atmosphere through an adsorbing bed of activated carbon. Gas adsorption efficiencies of an adsorbing bed decrease rapidly as concentration on the surface increases and the equipment needed to regenerate an efficient condition in the adsorbing bed is so expensive either in the initial cost, or in the maintenance or operational cost as to make such adsorption expensive and often impractical.

Adsorption beds for such purposes involve the use of complicated and expensive equipment for directing flow of such atmospheres through an adsorption bed and then periodically diverting the stream of atmosphere to another bed while the adsorbed material is being recovered or removed from the first bed and then the bed reactivated or regenerated to restore high efficiency of adsorption. The various instruments for controlling the direction of flow of the various vapor-laden atmospheres, recovery systems, and purification and cooling systems, make such operations impractical, particularly where the atmosphere contains small proportions of such vapors or the value of materials recovered therefrom does not offset the cost of such recovery or removal.

In accordance with the present invention, it has now been found that such expensive control equipment and regenerating equipment is avoided by an integrated apparatus as described hereinafter which provides adsorption or absorption and regenerating cycles continuously with a minimum of automatic equipment. In the equipment described in detail hereinafter, a cylindrical bed of adsorbing or absorbing material, such as for example activated carbon, is supported in a wheel revolvable about the linear axis of the cylinder. The wheel and consequently the bed of adsorbing or absorbing material contained therein, is divided into a number of segments by impermeable walls sealing each segment from adjacent segments, the segment walls running from the axis of the cylinder to the circular periphery of the cylinder. These segment walls are positioned in a manner resembling spokes in a wheel.

By periodically revolving the cylinder through a distance of one or more segments about its linear axis, the various segments can be positioned and moved in sequence through various zones in which the steps of adsorption or absorption, desorption, and regeneration, and also cooling if desired, can be sequentially performed on the bed of adsorbing or absorbing material in each segment of the cylinder.

In the drawings, FIG. 1 is a perspective view of a preferred modification of the apparatus of this invention with a cylindrical bed of adsorbing or absorbing material divided into eight segments with the linear axis of the cylinder arranged in a horizontal position with the front cover of the apparatus removed to show the inner arrangement.

Figure 1:
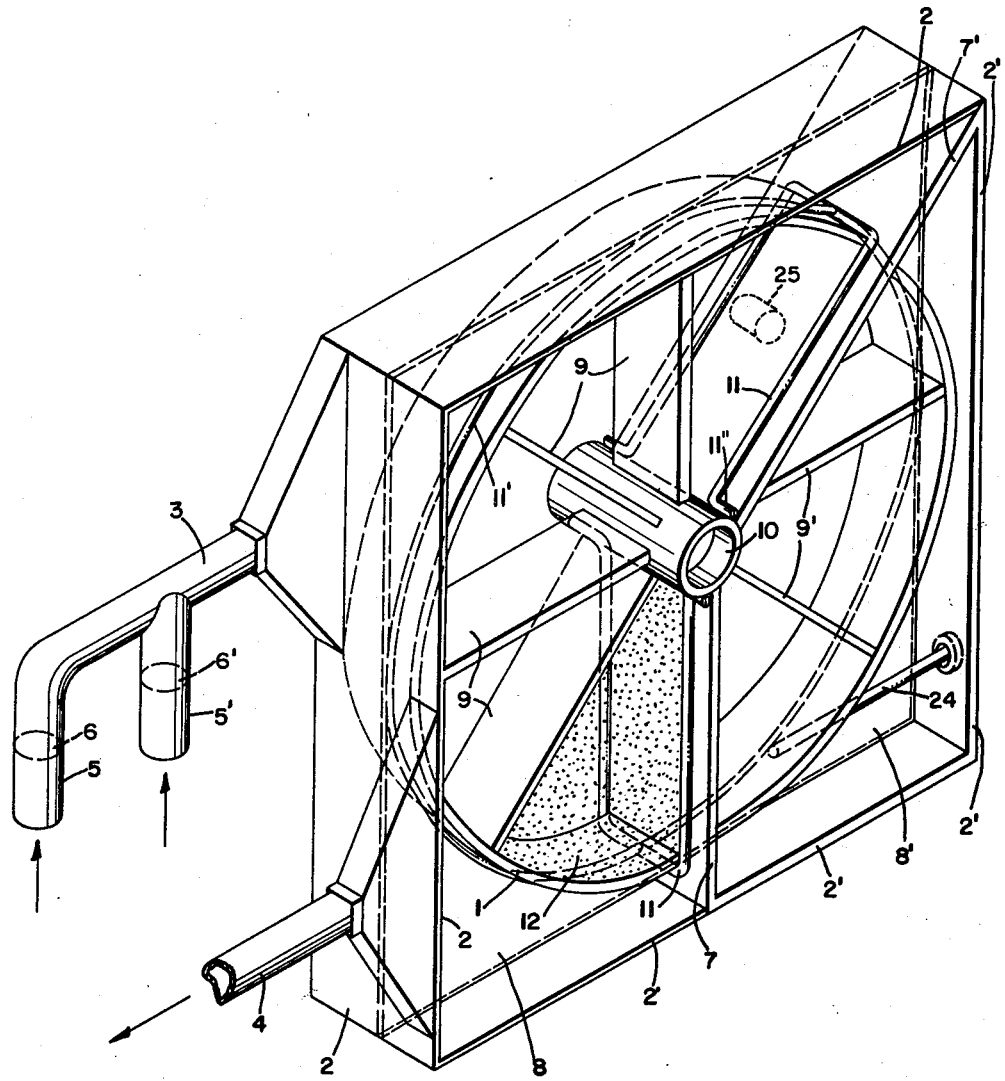
In FIG. 1 this driving mechanism has been omitted from the shaft of the wheel to simplify the drawing.

The revolvable wheel of this invention is divided into a number of inner segments which are adapted to contain particles of adsorbing or absorbing material therein in such a manner that a gas passed into one lateral side of the wheel will pass through the adsorbing or absorbing particles in these segments and out the other lateral side of the same segments of the wheel. The absorbing or adsorbing particles are retained in the individual segments of the wheel by a screen fixed on each side of the wheel which permits passage of the gas and is of appropriate mesh size to retain the absorbing particles in the wheel segment. The wheel is enclosed in a chamber which has a dividing wall in a plane perpendicular to the axis of the wheel and dividing the outer portion, or all of that portion of the chamber not actually occupied by the wheel, into two sections, one of which sections is the inlet side for gases passing into the segments of the wheel and the opposite side is the outlet side through which exit gases pass after they have passed through the segments of the wheel. This dividing wall is fitted sufficiently close to the rim of the wheel or is gasketed effectively so as to require substantially all of the gas passing through the chamber to pass through the segments of the wheel.

A second dividing wall perpendicular to the plane of the first dividing wall also divides the chamber into two compartments or more if desired, one of which is the adsorbing or absorbing compartment previously described, hereinafter referred to as the "adsorbing compartment," and the second being a steam, desorbing and regenerating compartment. This second dividing wall is designed with an appropriate shape and angle so as to concide with and extend from two of the segment walls of the wheel. In this way a number of wheel segments can be completely in the adsorbing compartment and sealed off from a number of other segments which are completely in the steaming, desorbing and regenerating compartment of the chamber. For brevity, the steaming, desorbing and regenerating compartment is hereinafter sometimes referred to merely as a "steam compartment."

The same dividing wall which separates the inlet and outlet sides of the adsorbing compartment extends into the steam compartment and divides that compartment in the portion outside of the wheel into an inlet side and an outlet side. In this manner, steam passed into or generated in the inlet side, must pass through the wheel segments and then out through the outlet side of the steam compartment.

One of the advantages of the apparatus of this invention is the fact that steam can be generated in situ by the insertion of a heater element in the steam chamber compartment since the steam requirement is so low as to permit economical generation of steam in this manner.

When the vapor to be desorbed from the adsorbing material in the wheel segments is of exceptionally high boiling point, the steam may be sufficiently super-heated by the use of additional heaters of the same type, or of strip-heater types known in the art. With this arrangement, it is only necessary to pass water into the steam chamber compartment and generate the steam in situ. However, where steam is available from other sources, it also is possible to use such steam and merely provide a steam inlet in place of the above heater element.

The area of the chamber outer wall which embraces the steam compartment is advantageously insulated so as to decrease heat losses and thereby decrease the amount of steam required for desorbing and regenerating purposes. An outlet is provided from the outlet side of the steam compartment so as to remove steam and the vapors which have been desorbed from the adsorbing material in the wheel segments. The recovered solvent vapors are then condensed and recovered according to well known standard methods.

A positive drive means is also provided to rotate the wheel periodically through a desired number of degrees so as to move one or more wheel segments from the adsorbing compartment to the steam, desorbing and regenerating compartment. Likewise, the same revolution of the wheel moves a corresponding number of segments from the steam compartment, where the efficiency of the adsorbing material has been restored, into the adsorbing compartment.

While a cooling step has not been found necessary in the use of this apparatus because of its efficiency compared to other apparatus used for similar purposes, such a compartment can be provided, if desired, by adding an additional dividing wall perpendicular to the first dividing wall so as to embrace a wheel segment after it leaves the steam compartment, and before it enters the adsorbing compartment. In such a cooling compartment, an inlet and outlet is provided for the flow of cooling gases therethrough in a manner similar to that in the other compartments.

Where it is desired, a sludge box can be provided for the purpose of removing and recovering vapors from sludge materials such as the sludge obtained from dry cleaning operations. Such a sludge box would be positioned in the area of the steam compartment not occupied by the wheel segments.

While various other means for effecting a seal between the edge of the segment walls and the compartment walls can be used, and between the wheel rim and the dividing wall, it has been found that such a seal can be very easily effected by inflatable tubing positioned between the wheel rim and the dividing wall and between the edge of said segment walls and the wall which separates the absorption compartment from the desorption and regenerating compartment. This tubing can have a cross-sectional structure of any convenient configuration such as circular, elliptical, rectangular, etc. When the tubing is inflated by fluid pressure therein, it makes a tight contact with the segment wall and with the adjacent compartment wall. When the cylindrical bed or wheel is to be rotated to another position, this tight contact is released by releasing the fluid pressure within the tubing. The deflation and inflation of the tubing is appropriately timed in accordance with the periodic rotation of the wheel.

The tubing is advantageously made of rubber although other flexible materials such as rubber-like plastics can be used. The material is advantageously resistant to the atmosphere and to the vapors contained therein so as to avoid deterioration or stiffening. Silicon rubber, particularly fluorinated silicon rubber, has been found particularly suitable where chlorinated or fluorinated hydrocarbon vapors are being recovered.

It has been found advantageous to rotate the wheel through one segment after a period of 15–120 minutes. A period of 60 minutes has been found particularly suitable for most purposes.

The apparatus of this invention can be used for the purpose of absorbing or adsorbing any vapor from an atmosphere which is not simultaneously adsorbed or absorbed by the absorbing or adsorbing material, and which adsorbed or absorbed vapor can be removed by the application of heat to the adsorbing or absorbing material. The apparatus is particularly applicable to recovery of chlorinated hydrocarbons, fluorinated hydrocarbons, fluorinated-chlorinated hydrocarbons, hydrocarbons, alcohols, ketones, etc. such as perchloroethylene or trichloroethylene, which is the solvent most commonly used in commercial dry cleaning operations, trichlorotrifluoroethylene, carbon tetrachloride, benzene, toluene, xylene, ethyl alcohol, et. The atmosphere is advantageously air but can also be any other gas which is inert to the absorbing material.

The terms "adsorb," "adsorbing," "adsorbable," etc. are intended to include "absorb," "absorbing," etc. and are intended also to embrace adsorption or absorption by chromatographic materials, such as activated alumina treated with silicones and thereby made capable of adsorbing hydrocarbons vapors from air, silica treated with sulfonated hydrocarbons and thereby made suitable for removing oxygenated hydrocarbons from air, silica treated with fatty acids and thereby made capable of removing polar compounds such as acetic acid vapors from air, etc.

While any absorbing or adsorbing material can be used which will effectively adsorb the desired vapors from the atmosphere and subsequently release them upon heating, a particularly advantageous material has been found to be activated carbon. The carbon is desirably in the form of particles having a size in the range of 4 to 30 mesh. As is well known, the smaller the particle size, the greater is the adsorption area and therefore, the more efficient the adsorption operation. While a thickness as small as 2.5 inches of activated carbon particles in the wheel segments has been found to operate effectively, it has been found advantageous to use a thickness of at least about 8.5 inches. Obviously the upper limit on such a thickness would be determined by the practical limitations of a wheel width that can be efficiently supported and operated and the pressure that would be required to force the atmosphere through the corresponding thickness of activated carbon or other adsorbing material.

Generally, the gas or atmosphere entering into the absorbing chamber is at a temperature of 40–200° F., preferably 70–160° F. In the steam chamber a temperature of 212–280° F. is found to operate satisfactorily. It has been found that in the apparatus described herein, there is generally no need to exceed 1 p.s.i., preferably no more than about 0.3 p.s.i. in forcing the atmosphere through the absorbing chamber. Satisfactory results are generally obtained by operating a pressure at about 0.5–1 inch of water.

In a typical operation for recovering dry cleaning solvents, such as perchloroethylene, from the atmosphere emanating or existing in the dry cleaning hoods or apparatus, the equipment is in use for this purpose for about 40 minutes out of every four hours or about 50 minutes out of every five hours. During the remaining time, the apparatus can be used for removing small amounts of solvent vapor which may have leaked into the general atmosphere. Therefore, in these intervening periods, the apparatus and process are economically and advantageously used to prevent air pollution.

The apparatus of this invention is best described by referring to the drawings which illustrate a preferred embodiment.

In FIG. 1 wheel 1 is contained in a chamber defined by outer chamber walls 2 and 2' which chamber has gas inlet 3 and gas outlet 4. Inlet 3 has two pipes 5 and 5' connected thereto so as to permit atmosphere to be directed into the chamber from different sources such as from a dry cleaning hood at one time and then at intervening periods, from the general atmosphere in the dry cleaning plant. In these two inlets, dotted sections show butterfly valves 6 and 6' which are used to control the particular atmosphere being fed to the chamber. In this chamber, walls 7 and 7' divide the chamber into two compartments which are referred to herein as the adsorbing compartment and the steam, desorbing and regenerating compartment. Also inside the chamber dividing walls 8 and 8' divide the chamber section outside of the portion occupied by the wheel into inlet and outlet sections. The wheel in this particular modification is divided into eight segments by walls 9 which are shown within the adsorbing chamber section and segment walls 9' which are shown in the steam chamber section. There are also two segment walls which in this view coincide with the compartment walls 7 and 7' and which because of the difficulty in representing them as such, are not distinguished in this view.

Figure 3:
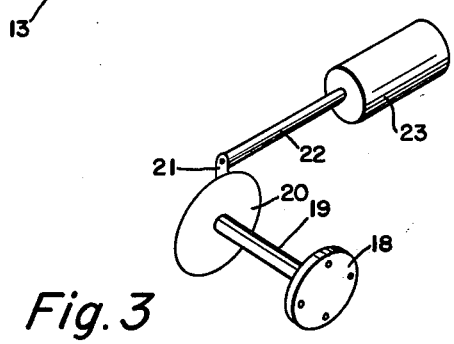
FIG. 3 shows the driving mechanism for turning the wheel or cylinder shown in FIG. 1.

The supporting and driving means for the wheel is not shown in FIG. 1 but is omitted for simplicity purposes. The wheel can be supported by the axle inserted in the opening 10 shown in the center of the wheel. The axle can be supported at one end, preferably at the back, or can be supported at both ends, e.g. at both the back and front of the wheel. A typical driving means is illustrated in FIG. 3.

Inflatable tubing 11, 11' and 11" encircles the rim of the wheel and the two segment walls which divide the segments presently within the steam chamber section from the segments presently in the adsorbing section. Section 11' of this tubing runs between the rim of the wheel and the dividing wall 8 and 8' and when inflated effects a seal between them. Section 11 of this tubing runs between the edge of the aforementioned segment walls and the compartment walls 7 and 7' so as to effect an efficient seal between the steam compartment and the adsorbing compartment. Section 11" effects a seal between the hub of the wheel and the adjacent edges of compartment walls 7 and 7'. The ends of section 11" are sealed. The inflating means and connection thereof to the inflatable tubing are not shown.

The dots shown in segment 12 illustrate the presence of adsorbing particles such as particles of activated carbon. These particles are present in each of the segments throughout the wheel and are retained therein on each side of the wheel by a perforated wall or screen which, for purpose of simplicity, is not shown in the drawings. Heating tube 24 is in the steam compartment on the inlet side of dividing wall 8'. On the opposite side of dividing wall 8', namely on the steam outlet side of the steam compartment, there is an outlet for steam and recovered vapors. This outlet is indicated by dotted outline 25 which represents a tubular opening extending from the back or side panel or wall. The chamber outer walls 2' which embrace the steam compartment, and also compartment walls 7 and 7', are shown to be of extra thickness to indicate the use of insulating material to reduce heat losses from this compartment.

Figure 2:
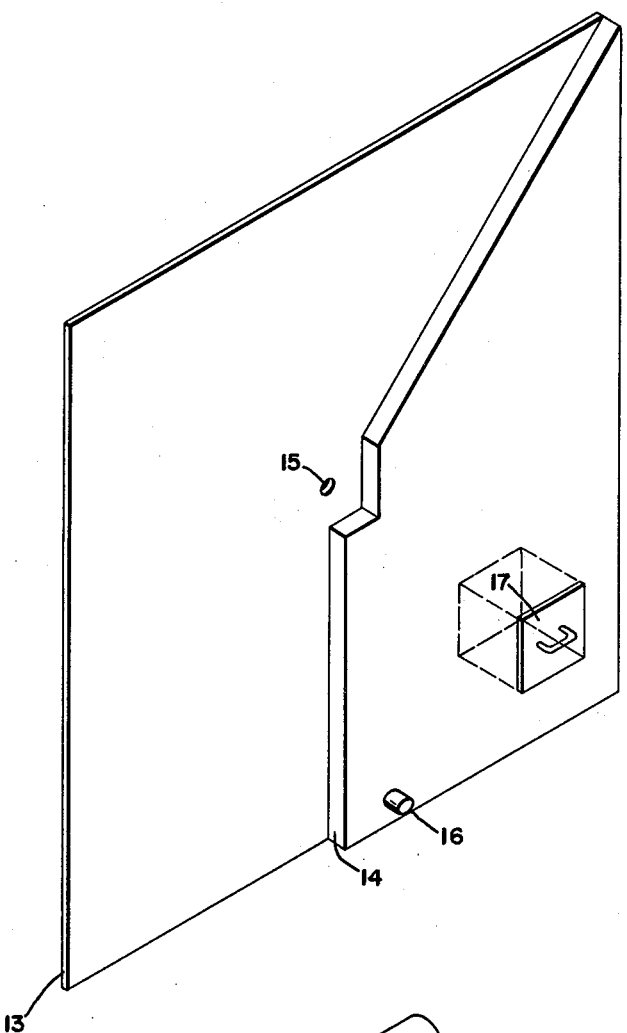
FIG. 2 shows a perspective view of this front cover.

FIG. 2 shows the removable front panel which is fitted onto the apparatus of FIG. 1 during operation thereof. Any appropriate means for fastening can be used. Wall 13 is designed to fit tightly onto the outer walls 2 and 2' of the chamber of FIG. 1 and also to fit tightly against the compartment walls 7 and 7' of FIG. 1. Wall 14 has an extra thickness of insulating material in that section which, when assembled to the apparatus of FIG. 1, covers the steam compartment. A similar insulating wall can be provided on the back side of the chamber. Opening 15 is provided to permit passage of the axle or driving shaft. Opening 16 is a water inlet for steam generation. The water level control means is not shown. A sludge box 17 is shown located in this removable panel. This sludge box can also be located in the side wall of this steam chamber section in a region which will not interfere with the wheel or heating unit. This box is used to accommodate the insertion of sludge or particles which have adsorbed or absorbed vapor of the type being removed from the atmosphere and thereby permits simultaneous recovery of such vapor from this type of material.

FIG. 3 illustrates a shaft arrangement which can be inserted in shaft opening 10 of FIG. 1 to serve as a driving means for the wheel. Disc 18 is of appropriate size to fit into the opening 10 and is turned by shaft 19. This shaft is connected to driving wheel 20 which in turn is connected by arm 21 to plunger 22. The plunger is moved forward by hydraulic cylinder 23. This movement is actuated periodically according to the period of treatment desired in each cycle and the number of segments to be moved to and from the steam, desorption and regenerating compartment.

It has been proposed to improve the efficiency of adsorbing or absorbing beds for removal of perchloroethylene from an atmosphere laden therewith by diluting such an atmosphere with air and simultaneously reducing the temperature of such atmosphere. However, while such practice will not interfere with the efficient use of the present apparatus, it has been found that this apparatus is efficient enough in itself not to require such dilution or decrease in temperature to obtain equivalent efficiencies.

In a typical operation using the apparatus of this invention, an atmosphere laden with approximately 100 to 40,000 parts of perchloroethylene per million parts of air and at a temperature of 120–170° F., is fed into inlet 5 of the apparatus shown in FIG. 1. During this period, the butterfly valve 6 is open and the butterfly valve 6' is closed. This atmosphere enters the wheel chamber through inlet 3 on the inlet side of the adsorbing compartment. Then it passes through activated carbon beds maintained in the five segments shown in the adsorbing compartment in FIG. 1, each of which segments has a thickness of 8.6 inches of activated carbon with average particle size of approximately 4 x 16 mesh retained in the segment by a screen on each side of the wheel having a mesh size of 20 mesh or glass wool backing a 6 mesh screen. This atmosphere is passed through the adsorption compartment at a rate of approximately 400 cubic feet per minute and then passed out through the outlet side of the adsorbing compartment and through outlet pipe 4.

During this flow, a pressure of 15–60 p.s.i. is maintained in the inflatable tubing 11. After flow has continued for approximately 60 minutes, the flow is discontinued by turning butterfly valve 6 for a short period. The pressure in tubing 11 is released and the wheel then revolved through one segment by movement of the lowermost segment which was previously in the adsorbing compartment into the steam compartment. At the same time one segment, previously in the steam compartment is revolved into the adsorption compartment. Then the fluid pressure in tubing 11 is again applied to 15–60 p.s.i. and the butterfly valve 6 opened again so that flow can continue as before.

Water is flowed into inlet 16 at such a rate as to generate by means of heater element 12 a sufficient flow of steam through the three wheel segments in the steam chamber as to maintain a temperature of about 260° F. in the activated carbon retained in these wheel segments. This steam passes into the wheel segments from the steam inlet side which is shown in the front in the view illustrated in FIG. 1. This steam, together with the vapor released from the activated carbon, passes through the outlet side of the steam compartment and out an exit pipe into appropriate recovery equipment.

It has been found that under vapor-laden conditions of 160° F. and 0.1 p.s.i.a. of perchloroethylene, the activated carbon used in the apparatus of this invention has a capacity of approximately 43 pounds of perchloroethylene per 100 pounds of activated carbon. Obviously, however, with lower atmosphere temperatures and the same perchloroethylene content, the adsorbing capacity of the carbon will be increased somewhat. Under dilute conditions, for example, 0.0005 p.s.i.a. of perchloroethylene at 70° F., as might exist in the general atmosphere of a dry cleaning plant, the capacity of the activated carbon is 28 pounds of perchloroethylene per 100 pounds of activated carbon.

On this basis, it is advantageous to use cycles and size of equipment which can accommodate the amount of vapor in the super-laden atmosphere. In other words, the size of the wheel, or the number of such wheels and the amount of activated carbon or other adsorbing material retained therein should be designed of sufficient capacity so that all the vapor can be removed from the atmosphere without exceeding the capacity of the adsorbing material to retain the solvent vapor. Thus the rate of flow of super-laden atmosphere through the adsorbing compartment and the timing of the wheel revolutions should be so regulated that the amount of vapor carried in that volume of atmosphere passed through the adsorbing compartment is not more than the amount that can be adsorbed by the amount of activated carbon contained in the wheel segments that will be in the adsorbing chamber during the corresponding period.

The periods in which the apparatus is in use for removing the small amounts of solvent from the general atmosphere can be controlled automatically in accordance with the pressure that exists in line 5 which is the feed line from the solvent removal unit. Accordingly, when a blower is on for removal of solvent from a hood or for the blowing of hot air through clothing, the resultant increased pressure in line 5 can be used to actuate the closing of butterfly valve 6' and the opening of the butterfly valve 6. When the pressure in line 5 decreases by virtue of the blower being turned off, the decreased pressure can actuate the closing of butterfly valve 6 and the opening of butterfly valve 6'.

While the above-described apparatus is shown with the wheel in a vertical position, it is also possible to use this apparatus with the wheel in a horizontal position provided a retaining wall or screen of sufficient strength is used on the side of the wheel segments which will be the bottom side, to support the weight of the mass of adsorbing material in the segments. However, it is generally preferred to have the wheel in a vertical position so that the mass of adsorbing particles is supported by the rim of the wheel or by the segment walls instead of the retaining member or screen at the side of the wheel.

Moreover, while an inflatable tubing has been shown as a preferred means for effecting a gas-tight seal between the absorbing compartment and the steam compartment, it is also possible to use other means for effecting this sealing. For example, the segment walls and the compartment walls can be machined to give a very tight fit. However, since this causes friction or drag in the movement of the wheel, it is preferred to use other means, such as the inflatable tubing described.

It is also possible to effect the seal by having flexible flaps extending from the segment walls or compartment walls and from the bottom of the rim so as to overlap the compartment walls or segment walls respectively when the segment walls are aligned with the compartment walls. This means is more effective when the higher pressure is maintained in one of the compartments as compared to the pressure in the other compartment. For example by having a first flexible flap, such as a rubber flap, on the adsorbing compartment side of the segment wall shown in FIG. 1 in the vertical position and below the hub of the wheel, and a corresponding second flap on the compartment wall which runs from the hub of the wheel to the upper right-hand corner of the chamber. The first flap will overlap the corresponding compartment wall and the second flap will overlap the corresponding segment wall in such a manner as not to interfere with rotation of the wheel. A higher pressure in the adsorbing compartment as compared to the pressure in the sealing compartment will aid the sealing effect of these flaps.

While the preferred embodiment of the apparatus of this invention have been described above, it is contemplated that other equivalent means can be used in the practice of this invention. For example, a ferris-wheel type of an arrangement can be used whereby compartments containing an adsorbable material can be passed from an adsorbing chamber or compartment into a desorbing chamber or compartment similar to the manner described above. The prime requirement is that a bed of adsorbing material is retained in a chamber through which an atmosphere containing an adsorbable vapor is passed into contact with the bed of adsorbing material for an appropriate period to permit adsorption of the vapor, and then subsequently moving this bed into a desorbing chamber wherein steam is brought into contact with the bed for a sufficient period to desorb the vapor from the particles in this bed and thereafter returning the bed of adsorbing material in a regenerated condition to an adsorbing chamber, and the cycle repeated. Whether this operation is performed on a wheel in which the bed is contained in a segment of the wheel or in a compartment moving on a periphery of a wheel such as in a ferris-wheel arrangement, or on an endless conveyor or belt type of conveyance in which a bed of adsorbing material is passed through an adsorbing zone and then into a desorbing zone and the cycle repeated thereafter, with the two zones effectively sealed from each other and maintained under conditions described herein, it is contemplated as coming within the scope of this invention.

A particular advantage of this invention has been noted in the decreased amount of steam required in regenerating activated carbon to an efficiency suitable for removing very small amounts of solvent vapors such as perchloroethylene from the atmosphere. In present operation for the regeneration of activated carbon to an efficiency suitable for removing perchloroethylene from super-laden atmospheres, such as from dry cleaning hoods, 2–4 pounds of steam per pound of solvent on the activated carbon is generally sufficient to regenerate the carbon for that particular purpose. However, when it is desired to regenerate the carbon to such an efficiency that it can remove very small amounts, even traces of solvent from the atmosphere, the steam requirement is generally about 30–50 pounds per pound of solvent on the carbon. According to the present invention, by the use of super-heated steam having a temperature of 250–280° F., such as permitted by the heating elements shown in the apparatus described herein, the steam requirements are reduced to the range of 2–4 pounds of steam per pound of solvent on the carbon. The apparatus and process of this invention is particularly advantageous in effecting these conditions and thereby regenerating activated carbon to extremely high efficiency.

Certain features of this invention have been described in detail with respect to various embodiments thereof. However, it will, of course, be apparent that other modifications can be made within the spirit and scope of this invention, and it is not intended to limit the invention to the exact details shown above except insofar as they are defined in the following claims.

The invention claimed is:

1. A system for the recovery of vapor from an atmosphere containing said vapor comprising an adsorbing chamber having an atmosphere inlet means and an atmosphere outlet means, a desorption chamber having steam inlet means and steam outlet means, a bed of adsorbing material, a movable means positioned in said adsorption chamber adapted to support said bed of adsorbing material thereon and simultaneously permitting passage of an atmospheric gas through said supported adsorbing material and adapted to be transported from said adsorption chamber into said desorbing chamber, a supporting means positioned in said desorption chamber adapted to support a bed of adsorbing material while simultaneously permitting passage of steam therethrough and also adapted to be transported from said desorption chamber into said adsorption chamber, inflatable and deflatable means including an inflatable and deflatable toroidal tubing adapted when inflated to prevent passage of atmosphere between said adsorption chamber and said desorption chamber and adapted when deflated to permit movement of said bed supporting means to and from said adsorption and desorbing chambers, and transporting means for effecting the transfer of said bed of said adsorbing material from said adsorption chamber to said desorption chamber, and a transporting means for transferring said bed of adsorbing material in said desorption chamber to said adsorption chamber.

2. The system for the recovery of vapor from an atmosphere containing said vapor comprising a closed chamber having an atmosphere inlet means, an atmosphere outlet means, a steam inlet means and a steam outlet means, a revolvable wheel positioned in said chamber, said wheel having a number of inner sector walls running from the hub of said wheel to the rim of said wheel and dividing the inner space of said wheel into a plurality of sectors, a porous retaining means on each side of said wheel adapted to retain finely divided material in each of said sectors, a bed of adsorbing material, an inner dividing wall in said chamber in a plane perpendicular to the axis of said wheel dividing the space in said chamber which is outside the space occupied by said wheel, said atmosphere inlet being on one side of said dividing wall and said atmosphere outlet being on the opposite side of said dividing wall, two compartment walls, each of which compartment walls is in a plane passing through the axis of said wheel and perpendicular to the plane of said dividing wall, said compartment walls being at the same angle to each other as the angle between two of said sector walls and the planes of said compartment walls being adapted to coincide with the planes of said sector walls when one of said sector walls is aligned in the same plane as one of said compartment walls, said compartment walls dividing the inner space of said chamber which is not occupied by said wheel into an adsorbing compartment and a steam compartment, said adsorbing compartment being positioned in the same general area of said chamber in which said atmosphere inlet and said atmosphere outlet are located, said steam compartment having said steam inlet means on one side of said dividing wall and said steam outlet means on the other side of said dividing wall, inflatable and deflatable means including an inflatable and deflatable toroidal tubing adapted to effect substantially gas-tight sealing between said compartment walls and two of said segment walls when aligned therewith, a means for controlling the effecting and releasing of said sealing, and a means for periodically rotating said wheel, said chamber being substantially gas-tight thereby allowing the flow of gases therethrough by means of said atmosphere inlet and outlet means and the flow of steam therethrough by means of said steam inlet means and steam outlet means.

3. A system of claim 2 in which said steam inlet means comprises a heating element and a water inlet means.

4. A system of claim 2 in which said wheel is divided into eight sectors.

5. A system of claim 4 in which said compartment walls are at an angle adapted to embrace three of said sectors in said steam compartment.

6. A system of claim 2 in which each of said sectors is filled with activated carbon.

7. A system of claim 6 in which said activated carbon has a particle size of 4–30 mesh and is retained in said sector by a porous screen on each side of said wheel.

8. The system for the recovery of vapor from an atmosphere containing said vapor comprising a closed chamber having an atmosphere inlet means, an atmosphere outlet means, a steam inlet means and a steam outlet means, a revolvable wheel positioned in said chamber, said wheel having eight inner sector walls running from the hub of said wheel to the rim of said wheel and dividing the inner space of said wheel into eight sectors, a porous retaining means on each side of said wheel adapted to retain finely divided material in each of said sectors, an inner dividing wall in said chamber in a plane perpendicular to the axis of said wheel dividing that space in said chamber which is outside the space occupied by said wheel, said atmosphere inlet being on one side of said dividing wall and said atmosphere outlet being on the opposite side of said dividing wall, two compartment walls, each of which compartment walls is in a plane passing through the axis of said wheel and perpendicular to the plane of said dividing wall, said compartment walls being at an angle to each other corresponding to the angle between two of said sector walls and adapted to coincide with the planes of said sector walls when one of said sector walls is aligned in the same plane as one of said compartment walls, said compartment walls dividing the inner space of said chamber which is not occupied by said wheel into an adsorbing compartment and a steam compartment, said adsorbing compartment being positioned in the same general area of said chamber in which said atmosphere inlet and said atmosphere outlet are located and containing an adsorbent material therein, said steam compartment having said steam inlet means on one side of said dividing wall and said steam outlet means on the other side of said dividing wall, an inflatable and deflatable means including inflatable and deflatable toroidal tube adapted to effect substantially gas-tight sealing between said compartment walls and two of said sector walls when aligned therewith, a means for controlling the effecting and releasing of said sealing, and a means for periodically rotating said wheel, said chamber being substantially gas-tight thereby allowing the flow of gases therethrough by means of said atmosphere inlet and outlet means and the flow of steam therethrough by means of said steam inlet means and steam outlet means.

9. A system of claim 8 in which said steam compartment embraces three of said sectors.

10. A system of claim 9 in which each of said sectors is filled with activated carbon.

11. A system of claim 10 in which said steam inlet means comprises a heating element and a water inlet means.

References Cited by the Examiner
UNITED STATES PATENTS

| | | | |
|---|---|---|---|
| 1,602,500 | 10/26 | Nuss | 55—181 |
| 2,211,162 | 8/40 | Ray et al. | 55—74 |
| 2,302,807 | 11/42 | Shoeld | 55—34 |
| 2,476,472 | 7/49 | Arnold et al. | 55—61 |
| 2,500,056 | 3/50 | Barr | 55—400 |
| 2,639,000 | 5/53 | Edwards | 55—179 |
| 2,662,607 | 12/53 | Moragne | 55—179 |
| 2,792,071 | 5/57 | Pennington | 55—34 X |
| 2,993,563 | 7/61 | Munters et al. | 55—34 |
| 3,009,540 | 11/61 | Munters | 55—34 |

REUBEN FRIEDMAN, *Primary Examiner.*

EUGENE BLANCHARD, *Examiner.*